United States Patent [19]

Miller

[11] Patent Number: 5,255,146
[45] Date of Patent: Oct. 19, 1993

[54] ELECTROSTATIC DISCHARGE DETECTION AND CLAMP CONTROL CIRCUIT

[75] Inventor: William E. Miller, Los Gatos, Calif.

[73] Assignees: National Semiconductor Corporation, Santa Clara, Calif.; National Semiconductor Corporation, Santa Clara, Calif.

[21] Appl. No.: 752,036

[22] Filed: Aug. 29, 1991

[51] Int. Cl.$^5$ .............................. H02H 9/04
[52] U.S. Cl. ..................... 361/56; 361/111; 361/113
[58] Field of Search ............ 361/56, 91, 111, 113

[56] References Cited

U.S. PATENT DOCUMENTS

| | | | |
|---|---|---|---|
| 4,363,068 | 12/1982 | Burns | 361/91 |
| 4,692,834 | 9/1987 | Iwahashi et al. | 361/91 |
| 4,787,007 | 11/1988 | Matsumura et al. | 361/91 |
| 4,890,187 | 12/1989 | Tailliet et al. | 361/111 |

OTHER PUBLICATIONS

IBM Technical Disclosure Bulletin, vol. 22, No. 10, Mar. 1980 "*Voltage Programmable Protect Circuit*" Hoffman et al.

*Primary Examiner*—Todd E. Deboer
*Attorney, Agent, or Firm*—Limbach & Limbach

[57] ABSTRACT

A switching element is connected to an integrated circuit for shunting an ESD pulse away from the integrated circuit features. A plurality of detection circuits responsive to typical ESD waveform characteristics provide logical control of the switching means. In the preferred embodiment, a NAND gate drives the switching element. The first input to the NAND gate is a first RC network having a first time constant that exceeds the characteristic rise time of the typical ESD pulse, but not the characteristic duration of the typical ESD pulse. The second input to the NAND gate is a feedback loop from the NAND gate output. The feedback loop includes a second RC network having a second time constant that exceeds the duration of a noise pulse, a third RC network having a third time constant that approximates the characteristic duration of the typical ESD pulse, and an inverter between the second and third RC networks. Application of the ESD pulse causes the first input to drive the NAND gate, thus turning on the switching element, and if the ESD pulse is still present when the second time constant is exceeded, the switching means is latched on via the second input until the third time constant is exceeded.

5 Claims, 3 Drawing Sheets

ELECTROSTATIC DISCHARGE DETECTION AND CLAMP CONTROL CIRCUIT

FIELD OF THE INVENTION

The present invention relates generally to protection circuits and, more specifically, to circuitry which protects against electrostatic discharge (ESD) in an integrated circuit.

DESCRIPTION OF THE PRIOR ART

Electrostatic discharge (ESD) in semiconductor integrated circuits (IC's) is a well-known problem. The inadvertent presence of a sudden voltage spike in an integrated circuit can cause physical destruction of circuit features. For example, ESD-induced spikes can rupture the thin oxide gate of field effect transistors (FET's), or degrade P-N junctions, effectively destroying proper IC operation. A typical silicon dioxide gate will rupture when its dielectric strength is more than approximately $10^7$ V/cm.

The most common source of ESD stress is user handling of IC packages. The human body can accumulate a static electric charge as high as 2000 V, or an amount of charge that can easily rupture the gate oxide or other IC features.

The most common method of guarding against ESD is to insert a diode in shunt to the line of interest to provide a resistive path to divert the ESD spike. See, e.g., U.S. Pat. No. 4,890,187 (Tailliet et al) and IBM Technical Disclosure Bulletin, Vol. 22, No. 10. Another solution is to connect a field effect transistor (FET) in shunt to the line of interest and operate the FET a gate-controlled drain avalanche breakdown mode. See, e.g., U.S. Pat. No. 4,692,834 (Iwahashi et al). However, these methods have had limited success. Typically, they have been used only to protect circuit inputs.

In yet another method, disclosed in co-pending application Ser. No. 452,879, an RC network is used in conjunction with an inverter driving a FET gate to open a shunt path for the ESD pulse, and a reset resistor provides protection for multiple pulses separated by more than 400 microseconds. However, some ESD pulses hit in intervals of less than 20 microseconds. Further, rapid chip power ups (less than 1 microsecond) or noisy power supply conditions may cause false triggering of the ESD shunt device. Also, the reset resistor draws leakage current.

Thus, it would be desirable if a detection and control circuit could turn on the ESD clamp at the start of the ESD pulse and keep the clamp on for the duration of the pulse. However, the clamp should remain off during rapid power up or noisy power supply conditions. Further, the clamped voltage should not exceed 5 volts during the ESD pulse. Also, the circuit should protect against ESD events separated by as little as 20 microseconds, and the circuit should draw an insignificant amount of leakage current.

SUMMARY OF THE INVENTION

The foregoing and other objectives and advantages can be realized by providing an ESD detection and control circuit which has switching means connected to an integrated circuit for shunting an ESD pulse away from the integrated circuit features, and a plurality of detection circuits responsive to the ESD waveform characteristics for providing logical control of the switching means.

According to the preferred embodiment, a NAND gate drives the switching element. A first input to the NAND gate is driven by a first RC network which exhibits a first time constant ramp up that exceeds the rise time but not the duration of the ESD pulse. A second input to the NAND gate is driven by a feedback loop from the NAND gate output. The feedback loop includes a second RC network having a second time constant ramp up that exceeds the duration of a noise pulse, a third RC network having a third time constant ramp up that approximates the duration of the ESD pulse, and an inverter between the second and third RC networks.

Upon application of the ESD pulse, the first network begins to ramp up and the first input is low, driving the NAND gate high and turning on the switching element. When the NAND gate goes high, the second network begins to ramp up. When the ESD pulse duration has exceeded the second time constant, the second network output goes high, and the inverter output goes low and latches the NAND gate via the second input. When the ESD pulse duration has exceeded the first time constant, the first input goes high, but the NAND has been latched on by the second input. When the third time constant expires, the second input goes high and the NAND is reset to low.

A better understanding of the features and advantages of the present invention will be obtained by reference to the following detailed description of the invention and accompanying drawings which set forth an illustrative embodiment in which the principles of the invention are utilized.

DETAILED DESCRIPTION OF THE INVENTION

A. General Design

According to the present invention, a circuit is provided for detecting and controlling a pulse of electrostatic discharge ("ESD") which impinges on an IC chip package. The ESD pulse may appear across any pair of pins on the IC package.

It is conventional to provide a switching element in the IC package to shunt the ESD pulse harmlessly away from the circuit features of the IC package. However, the present invention includes a plurality of RC networks which are designed to provide time constants which are comparable to different characteristics of the ESD pulse waveform, including pulse rise time and pulse duration, so as to provide a logic circuit for controlling the switching element.

Figure 1:
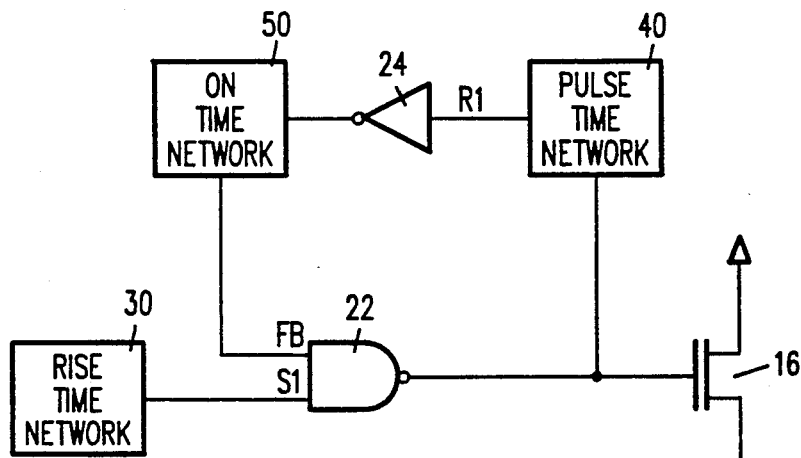
FIG. 1 is a logic diagram illustrating the present invention.

A generalized block diagram of the present invention is illustrated in FIG. 1. A two input NAND gate 22 drives the switching element 16. The switching element 16 will be on if either input S (set) or FB (feedback) is low (logical 0). The S input is driven by a first RC network 30 which has a first time constant $t_1$ which must be longer than the rise time of the ESD pulse, but shorter than the duration of the ESD pulse and shorter than the rise time of a normal application power supply. The FB input is driven by a feedback loop from the output of the NAND gate 22. The feedback loop includes a second RC network 40 and a third RC network 50 with an inverter 24 between them. The inverter input R is driven by the second RC network 40 which has a second time constant $t_2$. The second time constant $t_2$ is designed to confirm that an ESD pulse of expected duration has been detected, and not a false signal such as a rapid power up or noise on the power line. If so, then the NAND gate 22 will be latched by the feedback input FB and the switching element will be clamped on for a time period equal to a third time constant $t_3$ of the third RC network 40.

Figure 2:
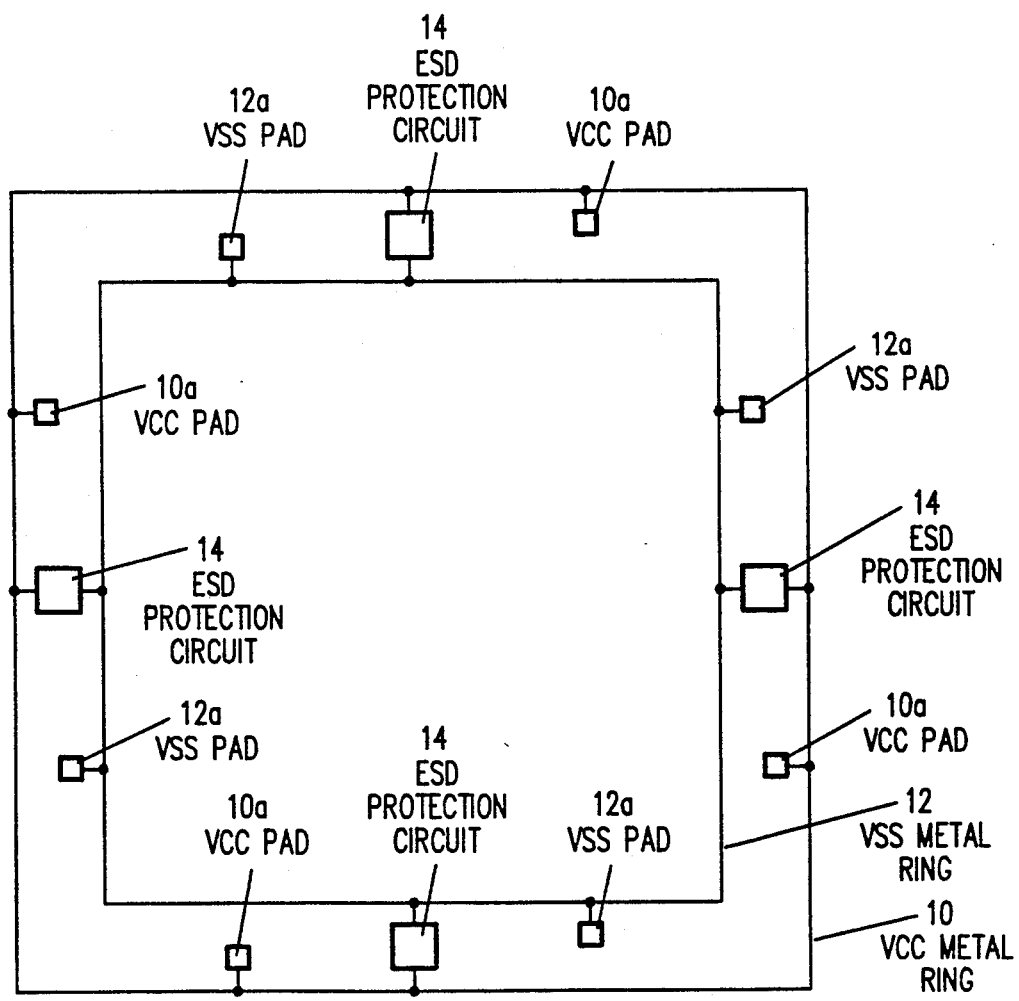
FIG. 2 is a plan view of metal ring layout on an integrated circuit chip.

Referring now to FIG. 2, an IC chip includes at least two metal rings 10, 12 which traverse the periphery of the IC chip in order to carry current and provide reference voltages to the individual integrated circuit features (not shown). Metal ring 10 is connected to a high reference voltage, VCC approximately 5 volts DC), and metal ring 12 connected to is a low reference voltage, VSS (usually ground). Individual integrated circuit features are connected through diodes and/or transistors (not shown) to the metal rings 10, 12 at one of a plurality of bonding pads 10a, 12a. It should be noted that while only four bonding pads are shown attached to each of the metal rings, there may be more or less bonding pads depending on the type of integrated circuit and its layout.

The metal rings 10, 12 drop a finite and calculable amount of voltage during an ESD event. For example, in National Semiconductor's COPS ® family of microprocessor chips, 3×100 mil metal rings are fabricated with the IC to carry current to the various IC features, and the cross-section of such a metal ring will drop 2 volts at 2 amps.

Figure 4:
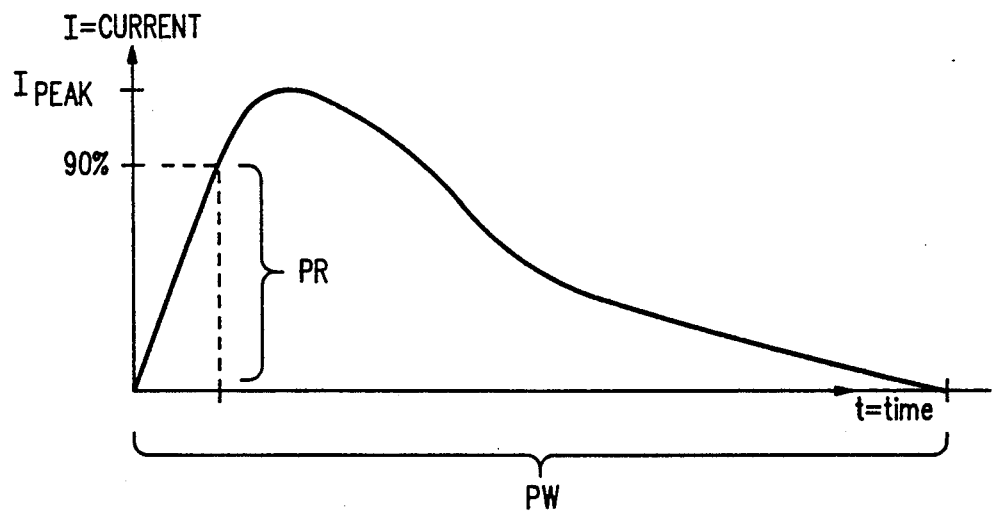
FIG. 4 is a plot of current versus time for the circuit of FIG. 3.

A plurality of ESD detection and control circuits 14 are connected between the metal rings 10, 12 to detect and control an ESD pulse, such as that illustrated in FIG. 4, which may impinge upon any of the bonding pads 10a, 12a.

Figure 3:
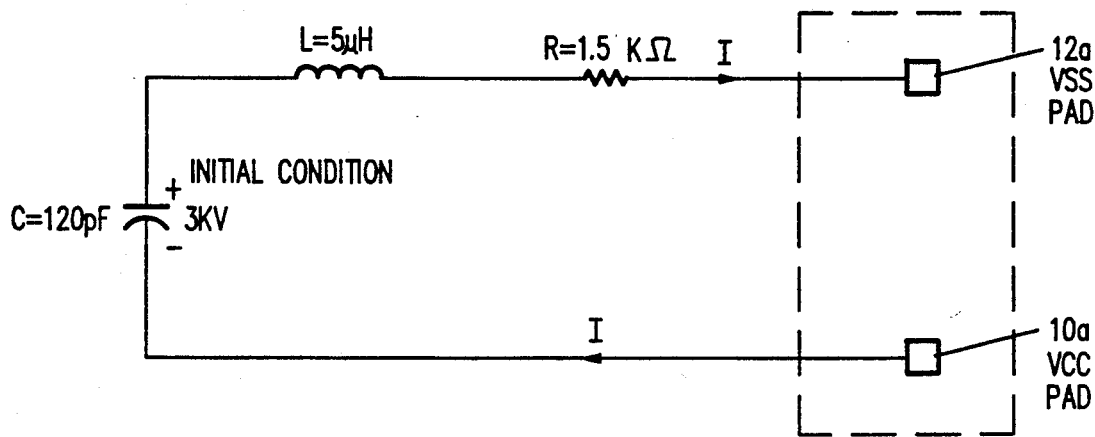
FIG. 3 is a circuit schematic illustrating the human body model for electrostatic discharge.

Referring now to FIG. 3, a circuit can be constructed to represent the ESD pulse which is issued by the human body. A 120 picofarad capacitor C stores up to 3 kilovolts of DC charge, and upon the touching any two bonding pads 10a, 12a, the charge is dissipated through a 5 microhenry inductor L and a 1.5 kiloohm resistor R.

The ESD pulse waveform from the human body model is illustrated in FIG. 4. Two of the characteristics of the ESD pulse waveform which are utilized to build the detection and control circuit of the present invention are pulse rise time PR and pulse width or duration PW. The pulse rise time PR is typically defined as the time required for the leading edge of the pulse to rise from zero to 90% of its maximum amplitude. For the human body model, the rise time is approximately 2.3 * L/R = 7.7 nanoseconds. The pulse width PW is total duration of the pulse, which may be determined by adding the rise time to the decay time, i.e., the time for the signal to decay from its maximum amplitude to 10% of maximum. For the human body model, the decay time is approximately 2.3 * RC = 414 nanoseconds. Thus, the pulse width PW is approximately 422 nanoseconds. In practice, the rise time of a actual ESD pulse may actually be as fast as 1 nanosecond or as long as 20 nanoseconds. Further, the duration of a actual ESD pulse may be anywhere from 100 to 1000 nanoseconds.

Figure 5:
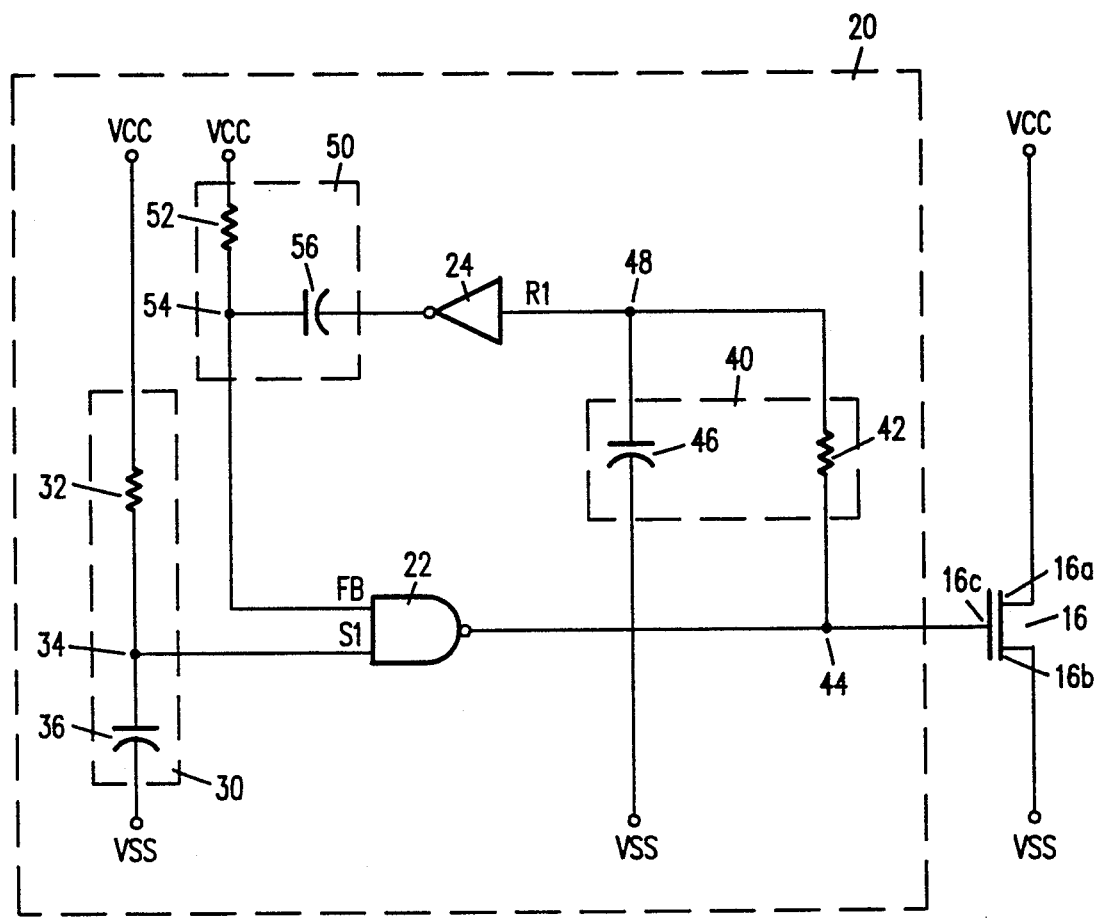
FIG. 5 is a circuit schematic of a detection and control circuit in accordance with the present invention.

Referring now to FIG. 5, the circuit 14 of the present invention is illustrated in more detail. A MOS transistor 16 is used as the switching device or ESD clamp by having its drain 16a and source 16b connected between VCC, i.e. metal ring 10, and VSS, i.e., metal ring 12. Gate 16c is driven by a NAND gate 22 in the ESD detection and control circuit 20. Preferably, the ESD clamp 16 is an n-channel MOS transistor measuring 6300 microns wide by 1.1 microns long.

The first input S of the NAND gate 22 is driven by the first RC network 30. The first RC network 30 includes a resistor 32 connected between VCC and node 34, and a capacitor 36 connected between node 34 and VSS. Node 34 is the NAND gate input S. The RC time constant $t_1$ of the first RC network 30 must be designed to be longer than the ESD rise time, but much shorter than the ESD duration to allow fast (approximately 100 nanoseconds) VCC power up during normal applications operations. Selecting resistor 32 as 7 kiloohms and capacitor 36 as 5 picofarads yields a 35 nanosecond time constant $t_1$ during which the voltage at node 34 will ramp up during the ESD event.

The second input FB of the NAND gate 22 is a feedback loop which includes the second RC network 40, the third RC network 50, and an inverter 24 between the second and third RC networks. The second RC network 40 has a resistor 42 connected between the NAND output (node 44) and the input R to the inverter 24 (node 48) and a capacitor 46 connected between VSS and the node 48. The third RC network 50 includes a resistor 52 connected between VCC and node 54 and a capacitor 56 connected between node 54 and the output of the inverter 24. Node 54 is the second NAND gate input FB.

The time constant $t_2$ of the second RC network 40 is intended to ensure that a false trigger of the ESD clamp is not latched. A false ESD signal could occur for a rapid power up (less than 5 nanoseconds) of the power supply, caused by system operating noise which exceeds a few volts. Selecting resistor 42 to be 7 kiloohms and capacitor 46 to be 1 picofarad, the time constant $t_2$ is 7 nanoseconds. This is long enough to ensure that the pulse detected is an ESD pulse and the NAND gate will be latched on through the feedback loop.

The time constant $t_3$ of the third RC network 50 is designed to maintain the latch on the NAND gate 22 for the duration of the ESD pulse, provided that the ESD pulse duration exceeded time constant $t_2$. This can be done by selecting resistor 52 to be 1 megohm and capacitor 56 to be 2 picofarads. This yields a time constant $t_3$ of 2 microseconds.

The NAND gate 22 preferably consists of a pair of CMOS transistors for the S input and the FB input, respectively. The S input CMOS measures 800 microns wide by 1.1 microns long in its p-channel and 1000 microns wide by 1.1 microns long in its n-channel, and has a trip point of VCC/3. The FB input CMOS measures 200 microns wide by 1.1 microns long in its p-channel and 1000 microns wide by 1.1 microns long in its n-channel, and has a trip point slightly above the threshold voltage of its n-channel The inverter 24 is also a CMOS transistor measuring 60 microns wide by 1.1 microns long in its p-channel and 10 microns wide by 1.1 microns long in its n-channel. The trip point is 2*VCC/3.

The preferred embodiment of the present invention (as shown in FIG. 5) has been layed out using 1 micron minimum CMOS geometries in a chip area of 110 square mils (11 mil wide by 10 mil high).

B Operation

Initially, i.e., at a quiescent time t=0, VCC=0 volts and the ESD clamp 16 if off. When the ESD pulse hits, VCC is driven to 5 volts within a few nanoseconds, and capacitors 36 and 46 begin to charge. The clamp 16 is turned on virtually immediately as the voltage between VCC and node 34 rises past the p-channel threshold voltage $V_{tp}$ of the 800 by 1.1 microns p-channel S CMOS transistor. However, S stays below the VCC/3 trip point of the NAND gate for approximately 18 nanoseconds.

After the initial 10 nanosecond ramp up, VCC falls only slightly during the next 50 nanoseconds. The feedback path through resistor 42 begins charging capacitor 46 as soon as the clamp 16 is turned on. After 8 nanoseconds, R rises above the 2*VCC/3 trip point of the inverter and begins to latch the clamp on.

VCC then falls fast (to 1.5 volts in 300 nanoseconds) and prevents resistor 52 from charging capacitor 56 above the threshold voltage $V_{tn}$ of the second NAND input FB. Therefore, as VCC falls due to the clamp 16 being on, node 44 is kept charged to 0.5 volts (a forward-diode drop) above VCC so that the VCC voltage can discharge to about 0.3 volts.

It should be understood that the invention is not intended to be limited by the specifics of the above-described embodiment, but rather defined by the accompanying claims. For example, the preferred embodiment is described as protecting VCC lines, but has equal application for protecting I/0 pins or other reference voltages.

I claim:

1. A protection circuit utilizable with an integrated circuit for protecting the integrated circuit features from a pulse of electrostatic discharge ("ESD"), the protection circuit comprising:
   a. switching means connected to the integrated circuit for shunting the ESD pulse away from the integrated circuit features; and
   b. control means connected to the switching means for activating the switching means, said control means including a plurality of detection circuits each responsive to a respective selected waveform characteristic of a typical ESD pulse to activate said switch means.

2. The protection circuit of claim 1, wherein the typical ESD pulse waveform has a rise time characteristic and a duration characteristic, and wherein the control means comprises:
   a. a first detection circuit which changes from logical 0 to logical 1 according to a first ramp up time which exceeds the rise time of the typical ESD pulse but is less than the duration of the typical ESD pulse;
   b. a second detection circuit which changes from logical 0 to logical 1 according to a second ramp up time which exceeds the duration of a noise pulse;
   c. a third detection circuit which changes from logical 0 to logical 1 according to a third ramp up time which approximates the duration of the typical ESD pulse, whereby the switching means is turned on by a logical 0 from the first detection circuit, and wherein the switching means is latched on when the second detection circuit changes to logical 1, and wherein the switching means is turned off when the third detection circuit changes to logical 1.

3. The protection circuit of claim 2, wherein the first, second, and third detection circuit comprise a first, second, and third RC network, respectively.

4. The protection circuit of claim 2, wherein the rise time of the typical ESD pulse ranges from one to twenty nanoseconds, and wherein the duration of the typical ESD pulse ranges from one hundred to one thousand nanoseconds.

5. A protection circuit utilizable with an integrated circuit for protecting the integrated circuit features from a pulse of electrostatic discharge ("ESD"), wherein a typical ESD pulse waveform has a characteristic rise time ranging from one to twenty nanoseconds and a characteristic duration ranging from one hundred to one thousand nanoseconds, comprising:
   a. switching means connected to the integrated circuit for shunting the ESD pulse away from the integrated circuit features;
   b. a NAND gate having a first input, a second input, and an output which drives the switching means;
   c. a first RC network driving the first input of the NAND gate, said first RC network having a first time constant which exceeds the characteristic rise time of the typical ESD pulse, but is less than the characteristic duration of the typical ESD pulse; and
   d. a feedback loop connected to the output of the NAND gate and driving the second input of the NAND gate, comprising:
      i. an inverter having an input and an output;
      ii. a second RC network connected between the output of the NAND gate and the input of the inverter, said second RC network having a second time constant which exceeds the duration of a noise pulse;
      iii. a third RC network connected between the output of the inverter and the second input of the NAND gate, said third RC network having a third time constant which approximates the characteristic duration of the typical ESD pulse;

whereupon application of the ESD pulse causes the first input to drive the NAND gate, thus turning on the switching element, and if the ESD pulse is still present when the second time constant is exceeded, the switching means is latched on via the second input until the third time constant is exceeded.

* * * * *